(No Model.)　　　　　　　　　　　　　　　　　　3 Sheets—Sheet 1.
H. F. AINLEY.
MACHINE FOR CUTTING SQUARE HOLES.
No. 438,791.　　　　　　　　　　　　Patented Oct. 21, 1890.

Witnesses:-　　　　　　　Inventor.-
　　　　　　　　　　　　Henry Francis Ainley
　　　　　　　　　　　　by his attorneys
　　　　　　　　　　　　Brown & Griswold (No Model.) 3 Sheets—Sheet 2.
H. F. AINLEY.
MACHINE FOR CUTTING SQUARE HOLES.
No. 438,791. Patented Oct. 21, 1890.
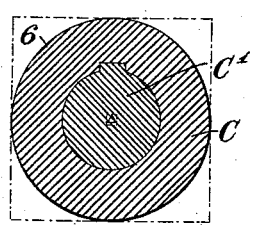
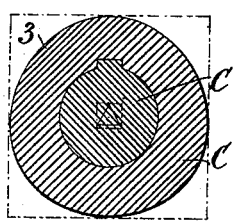
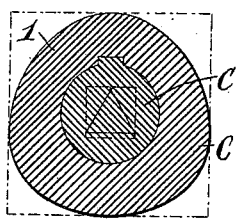
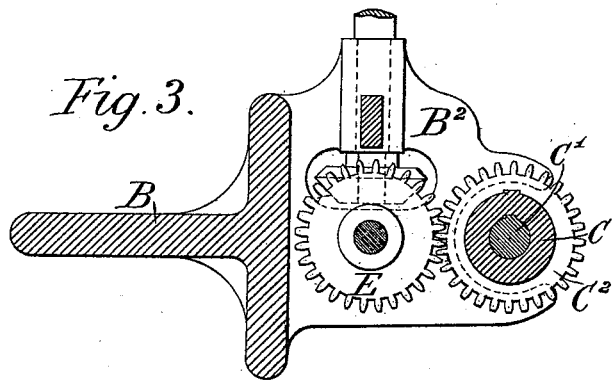
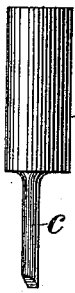
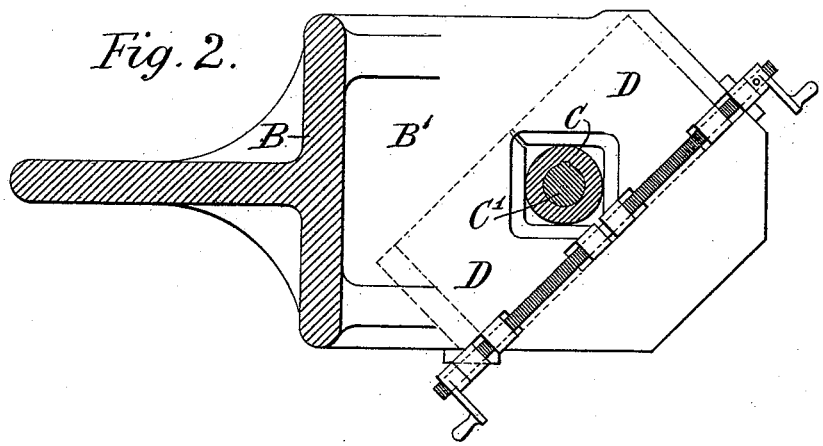
Witnesses:—
Inventor:—
Harry Francis Ainley
by his attorneys
Brown & Griswold
THE NORRIS PETERS CO., PHOTO-LITHO., WASHINGTON, D. C.

(No Model.) 3 Sheets—Sheet 3.
H. F. AINLEY.
MACHINE FOR CUTTING SQUARE HOLES.

No. 438,791. Patented Oct. 21, 1890.

Witnesses:—
F. George Barry
D. H. Hayward

Inventor:—
Harry Francis Ainley
by attorneys
Brown & Seward

UNITED STATES PATENT OFFICE.

HARRY FRANCIS AINLEY, OF LONDON, ENGLAND.

MACHINE FOR CUTTING SQUARE HOLES.

SPECIFICATION forming part of Letters Patent No. 438,791, dated October 21, 1890.

Application filed February 10, 1890. Serial No. 339,790. (No model.) Patented in England June 13, 1888, No. 8,688.

*To all whom it may concern:*

Be it known that I, HARRY FRANCIS AINLEY, of 476 Hackney Road, London, in the county of Middlesex, England, have invented certain new and useful Improvements in Machinery for Cutting Square Holes, (for which English Patent No. 8,688 was granted to me June 13, 1888,) of which the following is a specification.

This invention relates to a machine for cutting square holes. The spindle of the cutting-tool is mounted in the center of a cam-shaped sleeve and connected thereto by a feather. The cam portions of this sleeve are differently proportioned to suit the various sizes of holes to be cut and they work in square openings formed by fixed guide-plates, which serve as bearings for the sleeve and cause the same while rotating to move sidewise with its cutting-tool. Fitted to the sleeve by means of an external feather is a cam-shaped spur-wheel, which receives motion from a spur-pinion and allows of the spindle of the cutting-tool moving laterally while remaining in gear with the driving-pinion, and also of the sleeve being shifted endwise to bring one or other of the cams into line with the guide-plates.

Figure 1:
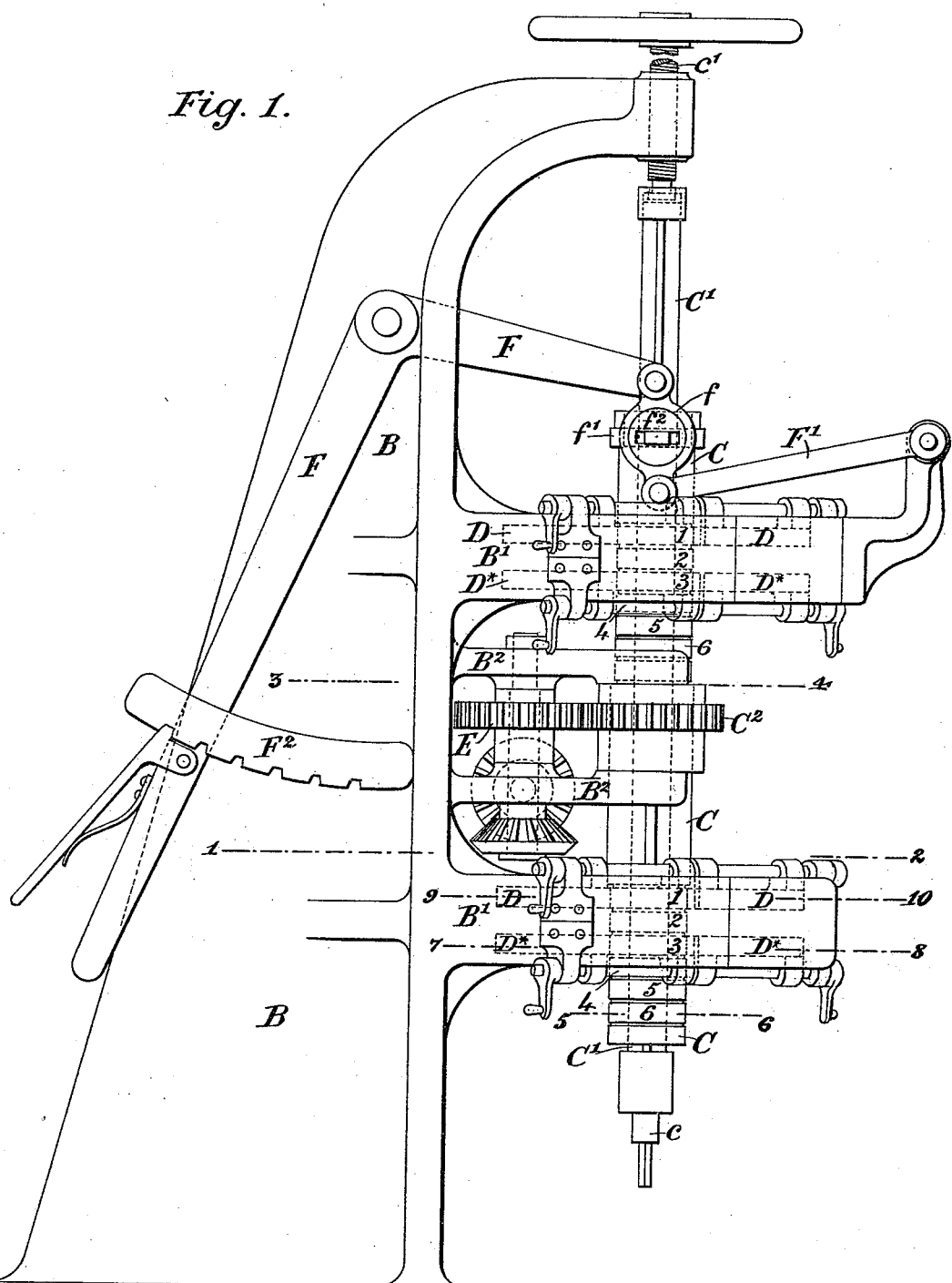
Figure 10:
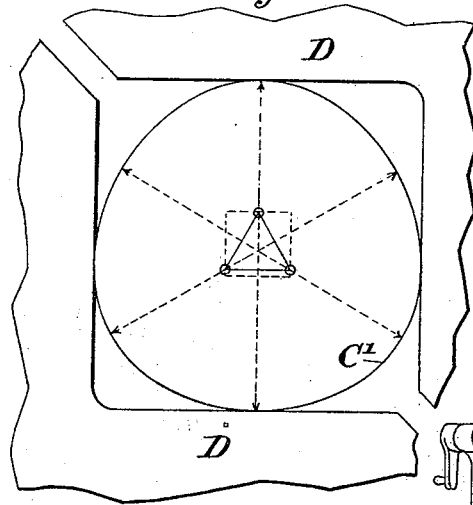
Figure 4:
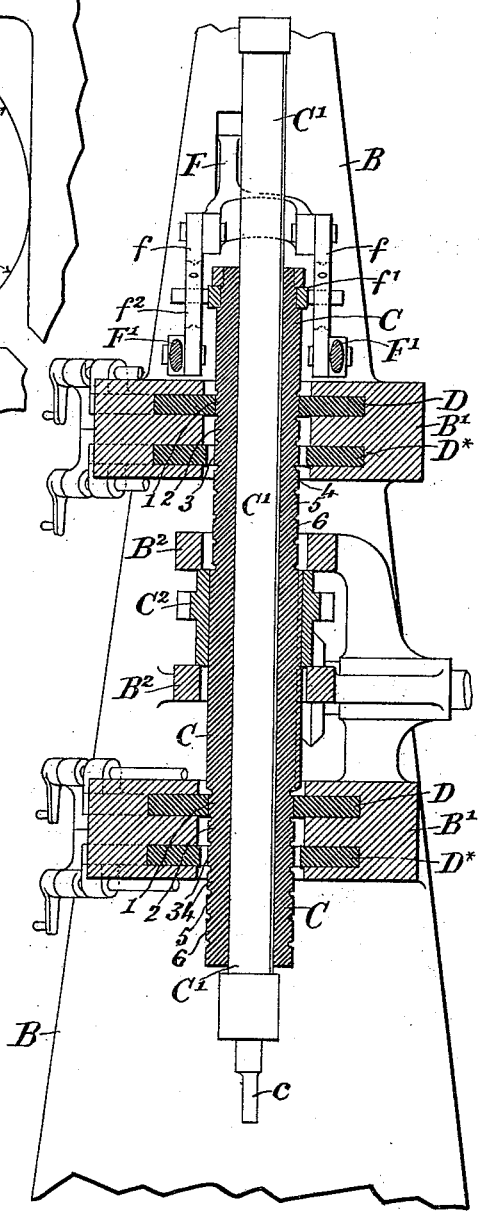

In the accompanying drawings, Figure 1 is a side elevation of a machine constructed according to my invention. Fig. 2 is a sectional plan view of the machine, taken in the line 1 2 of Fig. 1, showing the guide-plate arrangement for supporting the sleeve-cam and controlling the lateral movements of the cutting-tool. Fig. 3 shows in sectional plan at line 3 4, Fig. 1, the driving mechanism for the cutter. Fig. 4 is a partial vertical section of the machine, taken at right angles to Fig. 1 in the line of the axis of the cutter-spindle. Figs. 5, 6, and 7 are sectional plans, respectively, in the lines 5 6, 7 8, and 9 10, Fig. 1, of the cam-shaped sleeve and cutter-spindle. Figs. 8 and 9 are side and end views of a tangential cutter detached from its spindle, and Fig. 10 is a diagram showing the mode of producing the figures for the cams.

A is the base-plate of the machine, and B is a standard cast therewith.

B' B' are two brackets projecting from the standard and serving to carry the guide-plates, and $B^2$ are brackets for carrying the spindle-driving mechanism.

C is the cam-sleeve, furnished with six pairs of cams 1 2 3 4 5 6 for working in square openings formed by pairs of fixed guide-plates D D, which are fitted to the brackets B'. In the center of the sleeve C is situated the cutter-spindle C', which carries at its lower end the cutter $c$. (Shown detached at Figs. 8 and 9, and represented as having horizontal and vertical cutting-edges.) This spindle, which rotates with the sleeve C, is pendent from an adjustable hand-screw $c'$, which works in a threaded hole formed in the top of the standard. This screw is designed to feed forward the tool and keep it in contact with the work. It is loosely connected with the spindle to permit of the spindle moving sidewise with the rotating sleeve C.

$C^2$ is a cam-shaped spur-wheel formed with an elongated boss or sleeve, which slides over a feather projecting from the sleeve-cam, which at this part is cylindrical and concentric with the cutter-spindle. The boss or sleeve of this spur-wheel $C^2$ works within the forked extremities of the brackets $B^2$, which serve to prevent the wheel from shifting its plane of motion.

The pairs of hollow square guides D D, in which the pairs of cams 1 to 6 respectively work, are formed by making V-shaped notches in the opposed ends of two sliding plates, which notches, when the plates are placed in juxtaposition, form the desired square hole or guide. (See Fig. 2.) These plates are made to slide in guides in the brackets B', and may be worked in and out simultaneously by hand-screws or in any other convenient manner for the purpose of closing upon the cams or releasing them to provide for the shifting of other cams into position.

On a vertical axle carried by the brackets $B^2$ is mounted a toothed wheel E, which gears with the toothed wheel $C^2$. This axle is driven through bevel-gear from a hand-wheel or driven pulley, (not shown in the drawings,) as may be desired, placed at the side of the machine.

The cams forming a set are each of different cut; but they all fit alike the circumscribed square hole of the guide-plates in which they are caused to rotate. Their cut is dependent on the size of the square hole that it is intended to form, it being necessary to limit the traverse of the cutting-tool to suit the size of hole which is required to be formed. The rule for producing this result may be thus explained: Supposing I wish to cut a half-inch square hole, I provide a hollow square guide of any desired measurement—say two and a half inches across—which determines the size of the cams to be used. To determine the cut of the cam to fit such guide, I first draw an equilateral triangle (see the diagram Fig. 10) the sides of which correspond to the size of hole to be cut—say, for example, half an inch square. I then describe three arcs of one-inch radius, taking the points of junction of the sides of the triangle for the centers. I next join up these arcs by other arcs (one-and-a-half inch radius) described from the centers opposed to the arcs to be drawn, and the form and size of cam required is then produced. It will thus be seen that each cam varies in form according to the size of hole to be cut. The diameter, however, of the cams will correspond with the measurement of the square guides in which they work.

Figs. 5, 6, and 7 show the cams for cutting, respectively, a one-eighth inch, a three-eighths inch, and a three-fourths inch square hole.

In Figs. 1 and 4, as I have stated, six of these cams form a set, and the set is duplicated in order that the cam-sleeve may be steadied by two pairs of guide-plates, which form bearings for the cams to rub over as the sleeve is rotated by means of the gearing described.

To insure the proper action of the tool, its extreme cutting-point will preferably coincide with one of three centers of the arcs which form the periphery of the cam. It will now be understood that the action of the cams in the fixed guide-plates (when the sleeve C is rotated) will cause the spindle C' to move, so that its vertical axis is continually changing in position with respect to the work, the effect of which is that the tool following its motions makes a series of cuts, which eventually produce a square hole, or what is practically equivalent thereto. As the spindle has to move in the manner indicated, it will be evident that one of the gear-wheels, as $C^2$, must have a form such as that above indicated, and illustrated at Fig. 3. I may remark, however, that for particular work it may be desirable to have a toothed driving-wheel $C^2$ with a periphery corresponding to each cam; but for ordinary purposes in the cutting of square holes a toothed wheel having a periphery corresponding to the mean of all the cams may be employed.

I have not yet explained the means for supporting the cam-sleeve in its bearings and shifting it vertically to bring the various cams into their working position, as required. This will be clearly seen by reference to Figs. 1 and 4, where F is a bell-crank lever pivoted to the standard B and having a handle at its pendent end for working the same. The forward end of this lever is forked to receive pivots, which attach it to a pair of rings $f$, arranged vertically on opposite sides of the cam-sleeve C. An annular groove turned in this sleeve is fitted with a ring $f'$, from opposite sides of which project short studs. These studs enter straight slots formed, respectively, across the center of a pair of disks $f^2$, mounted loosely in the rings $f$. The rings $f$ are pivoted at their opposite sides to the branches of a forked radius-arm F', fulcrumed on an extension of the upper bracket B'. The lever F is fitted with a spring-catch, which takes into a notched sector $F^2$, attached to the standard B. Through the means just described the cam-sleeve C is maintained in a vertical position, while at the same time it is free not merely to rotate, but to move sidewise to present the cutting-tool to its work. When it is desired to bring a fresh cam into action, the hand-lever F is raised or lowered, as the case may be, the spring-catch being first disengaged from the notched sector, and when the desired cams are brought into line with their guide-plates the new position of the sleeve-cam is secured by the dropping of the spring-catch into the corresponding notch of the sector. Before this shifting of the cams is effected the guide-plates D should be opened out by the hand-screws, and when the cams are in position the plates must be closed by the same means upon the cams.

To enable this machine to drill round holes, it will only be necessary to open the square guides (thus throwing them out of use) and to shift the vertical position of the cam-sleeve, so as to bring cylindrical portions of that sleeve into line with the supplementary guide-plates $D^* D^*$, which are then to be closed upon the sleeve like the plates D upon the cams. When the sleeve C is thus adjusted, it will have merely rotary motion when driven—that is to say, it will give no traverse motion to the tool, which in this case will consist of a drill of any ordinary construction in place of the tool shown at Figs. 8 and 9. The cam-shaped wheel $C^2$ may be retained in use for actuating the drill, provided that its teeth are made sufficiently deep to compensate for the eccentric form of the wheel.

An obvious modification of this invention is to use but one cam in place of a series when it is desired to cut square holes of uniform size. In such case the cam is formed upon the cutter-spindle and works in guides, as already explained; but the cutter-spindle being pendent from the adjusting-screw will require no such support as is needed for the shifting cam-sleeve. The cam must, however, be of sufficient depth to insure its remaining in contact with the guide or guides, notwithstanding the feed movement of the cutter, which it must necessarily follow.

Having now described my invention, I wish it to be understood that I claim—

1. In a machine for cutting square or approximately square holes, the combination, with a cutter-spindle and a cutter thereon, a cam-sleeve in which said spindle is centered, and means for driving the cutter-spindle, of adjustable plates carried by the frame of the machine and provided with V-shaped notches, which when brought together form square guides for the cam-sleeve, as and for the purpose set forth.

2. In a machine for cutting square or approximately square holes, the combination, with a cutter-spindle fitted with a cutter, guide-plates, a cam-sleeve which works in the guide-plates and carries the cutter-spindle, and driving-gear also carried by said cam-sleeve, of an arrangement of mechanism for supporting the cam-sleeve and allowing of its vertical adjustment to bring the several cam-surfaces into use, as required, for cutting various-sized holes, such supporting mechanism consisting of a forked rock-lever, rings pendent from the lever, a pair of disks fitted to the rings, and an embracing-ring provided with studs which rest in transverse slots formed in the disks, and a notched sector, the said forked rock-lever having a spring-catch for locking into the segment-rack and thereby sustaining the cam-sleeve, substantially as set forth.

HARRY FRANCIS AINLEY.

Witnesses:
H. K. WHITE,
A. W. SPACKMAN.